United States Patent
Ørbekk

(10) Patent No.: US 7,478,778 B2
(45) Date of Patent: Jan. 20, 2009

(54) ROCKET ENGINE HAVING GUIDE VANES IN THE NOZZLE OF THE ENGINE

(75) Inventor: Erland Ørbekk, Gjøvik (NO)

(73) Assignee: Nammo Raufoss AS, Raufoss (NO)

( * ) Notice: Subject to any disclaimer, the term of this patent is extended or adjusted under 35 U.S.C. 154(b) by 0 days.

(21) Appl. No.: 10/572,862

(22) PCT Filed: Sep. 14, 2004

(86) PCT No.: PCT/NO2004/000272

§ 371 (c)(1),
(2), (4) Date: Sep. 5, 2006

(87) PCT Pub. No.: WO2005/028844

PCT Pub. Date: Mar. 31, 2005

(65) Prior Publication Data
US 2007/0152096 A1    Jul. 5, 2007

(30) Foreign Application Priority Data
Sep. 24, 2003    (NO) ................................... 20034266

(51) Int. Cl.
F42B 15/01    (2006.01)
F42B 10/00    (2006.01)
F42B 10/66    (2006.01)
F02K 9/80    (2006.01)
F41G 9/00    (2006.01)
F02K 9/97    (2006.01)

(52) U.S. Cl. ........................ 244/3.21; 244/3.1; 244/3.15
(58) Field of Classification Search ............ 244/3.1–3.3
See application file for complete search history.

(56) References Cited

U.S. PATENT DOCUMENTS

| | | | |
|---|---|---|---|
| 2,510,570 A | 6/1950 | Goddard | |
| 3,260,205 A | 7/1966 | Dietrich | |
| 4,063,685 A * | 12/1977 | Jacobs | 244/3.22 |
| 4,131,246 A * | 12/1978 | Rotmans | 244/3.22 |
| 4,175,385 A | 11/1979 | Nash | |
| 4,562,980 A | 1/1986 | Deans et al. | |
| 4,627,586 A * | 12/1986 | Krumins et al. | 244/3.21 |
| 5,511,745 A | 4/1996 | Faupell et al. | |
| 5,806,791 A | 9/1998 | Hatalsky et al. | |
| 6,450,443 B1 | 9/2002 | Kim | |

OTHER PUBLICATIONS

International Search Report for PCT/NO 2004/000272 dated Jan. 17, 2005 (2 pages).

* cited by examiner

*Primary Examiner*—Bernarr E Gregory
(74) *Attorney, Agent, or Firm*—Osha•Liang LLP

(57) ABSTRACT

A rocket engine having guide vanes in the engine nozzle the guide vanes (2) being mounted for turning at or near the rearmost ends of fixed vanes (1) being parallel to the axis of the nozzle and protruding into the combustion chamber of the engine. The foremost ends (4) of the guide vanes (2) may be shielded by the rearmost ends of the fixed vanes (1), and the guide vanes (2) may be individually turnable.

4 Claims, 1 Drawing Sheet

ROCKET ENGINE HAVING GUIDE VANES IN THE NOZZLE OF THE ENGINE

BACKGROUND

1. Field of the Disclosure

The present invention relates to a rocket engine having guide vanes.

Such guide vanes are used for guiding the rocket in a desired trajectory, by deflecting the flow of gas out of the engine in a particular direction.

2. Background Art

In rockets gases are produced by combustion, of solid or liquid fuels, and the gases are accelerated through a nozzle and out through the rearmost end of the rocket. The acceleration of the gases causes a thrust against the rocket oppositely of the direction of acceleration.

Known guide vanes are situated in the supersonic part of the nozzle, i.e. behind the combustion chamber, and are journalled for turning at or near their middle. When such a vane is turned, the parts of the vane forwardly and rearwardly of the axis of turning protrude to the respective sides of a diametrical middle plane in the nozzle and are hit by accelerating gases having a high velocity. Thereby, parts of the gas flow are retarded, and large flow losses and a reduction of the effective thrust occur.

The aim of the present invention is to reduce or mainly to eliminate such flow losses by regulating of guide vanes in rockets.

This is achieved by a rocket engine as defined in the succeeding, independent claim.

SUMMARY OF INVENTION

Hence, in the rocket engine according to the invention the guide vanes are journalled for turning at or near the rear end of fixed vanes which are parallel to the axis of the nozzle and protrude into the combustion chamber. In the combustion chamber the gases have approximately no velocity (relatively to the rocket) until they are heated by the combustion and are accelerated rearwardly through the nozzle. The largest acceleration takes place in the narrowest portion of the nozzle. The foremost end of the fixed vanes is situated in front of this portion, and is, therefore, not hit by gases having a high velocity, and the flow loss will here be at a minimum. Moreover, the foremost end of the guide vanes are shielded by the fixed vanes on which they are journalled, and are not hit by the flowing gases either. The accelerating and gradually rapidly flowing gases sweep along the sides of the fixed vanes and the guide vanes. When the guide vanes are turned, the gases are deflected and cause a thrust somewhat inclined relatively to the axis of the nozzle, and the direction of the rocket is changed.

The guide vanes may be individually steerable. Steering may take place by use of an electrical or mechanical system, for instance that a hinge between the fixed vane and the guide vane is associated with means for turning or that a shaft holding the guide vane can be turned.

The guide vanes must not necessarily have their axes of turning near the fixed vanes. Having the axes of turning near the fixed vanes eliminates the impact of the flowing gases against the guide vanes, but the energy requirement of the turning becomes relatively large. Having the axes of turning in a certain distance from the fixed vanes reduces the energy requirement of turning the guide vanes, but a certain impact of the gases against the guide vanes occurs. The axes of turning may in the principle be situated anywhere along the guide vanes.

The invention will in the following be explained by means of examples shown in the accompanying drawing.

DETAILED DESCRIPTION

Figure 1:
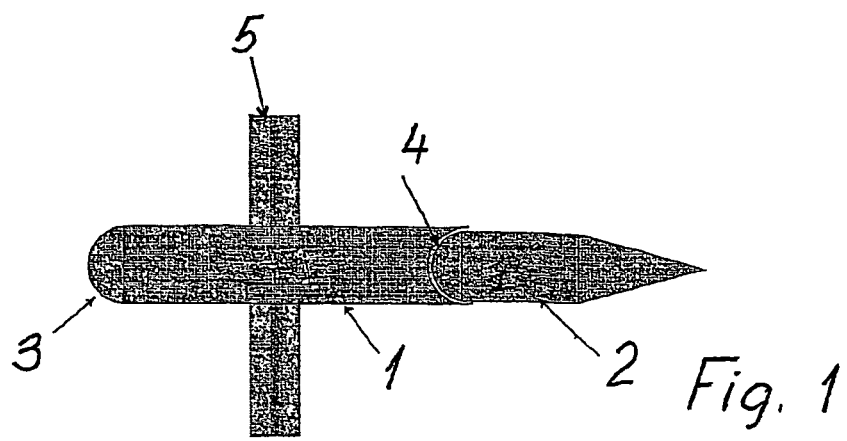
FIG. 1 shows schematically a stationary vane protruding through a choke portion in a rocket nozzle and a guide vane hinged to the fixed vane or fastened to a turnable shaft.

FIG. 1 shows a fixed vane 1, having a rounded foremost end 3. Behind the fixed vane is a guide vane 2, having a rounded foremost end 4. The guide vane 2 is hinged to the fixed vane 1 or fastened to a not shown, turnable shaft. The fixed vane 1 protrudes through the choke portion 5 in the nozzle, i.e. the narrowest portion. The portion to the left of the choke portion 5 is the combustion chamber of the engine.

Figure 2:
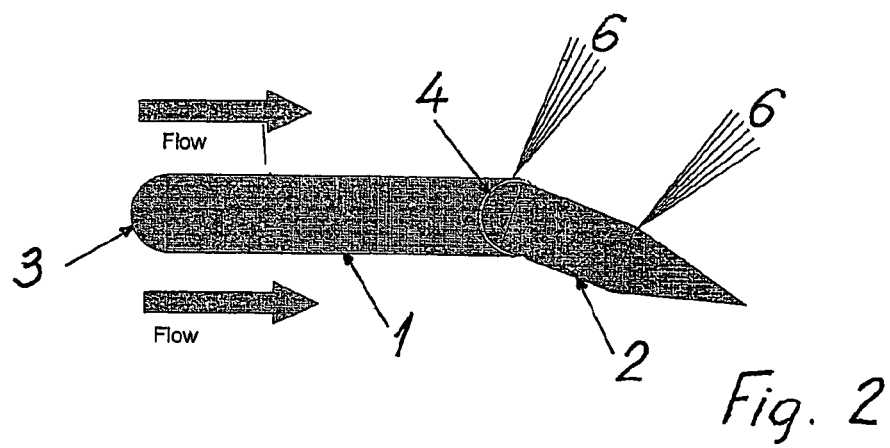
FIG. 2 shows the fixed vane and the guide vane inclined relatively to the fixed vane, in order to cause a change of direction of the rocket by deflecting the flowing gases.

FIG. 2 shows the fixed vane 1 and the guide vane 2 turned relatively to the fixed vane 1. The flowing gases sweep along the sides of the two vanes and are deflected by the guide vane 2. Thereby, low pressures arise in the portions 6. The inlet loss against the guide vane is minimized, as the inlet of the gases towards the guide vane is on the lee side of the fixed vane.

Because the velocity of the gases in the combustion chamber, where the foremost ends 3 of the fixed vanes 1 are situated, is low, the gases do not hit these ends, but start accelerating rearwardly. Thereby, no flow loss due to the ends 3 of the fixed vanes occurs. The gases sweep along the sides of the vanes 1 and 2, and because the foremost ends of the guide vanes 2 are shielded by the rearmost ends of the fixed vanes, the gases do not impact against the foremost ends of the guide vanes 2 either.

Figure 3:
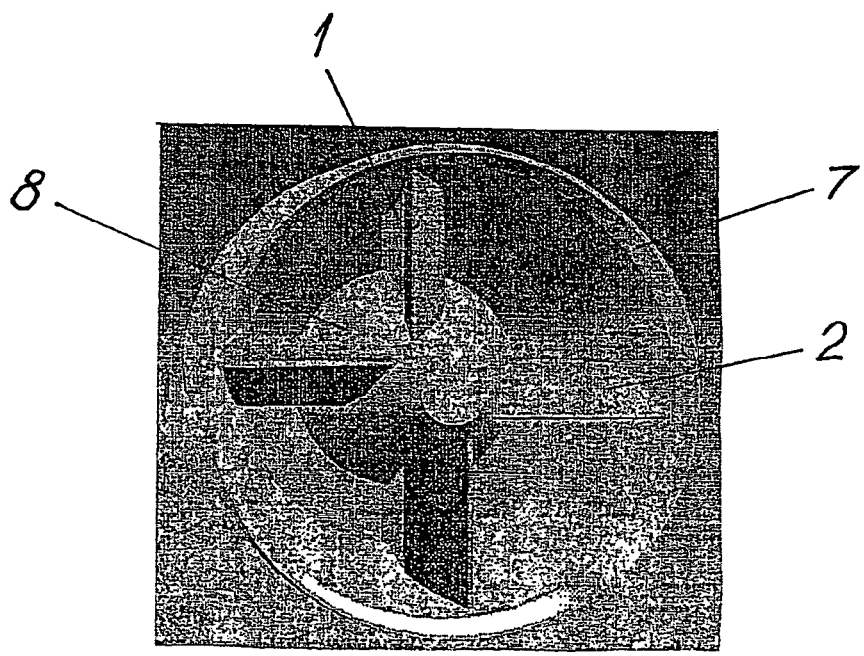
FIG. 3 shows an embodiment of the rear portion of a rocket nozzle, in which are mounted four fixed vanes, each equipped with a guide vane, the fixed vanes being mounted on a central cone in the nozzle.

FIG. 3 shows how the vanes may be provided inside of a nozzle 7 in a rocket engine. The example shows four pairs of vanes, without this constituting any limitation. The fixed vanes 1 are mounted on a central cone 8 in the nozzle, and connect the cone 8 and the nozzle 7. The guide vanes 2 are hinged to the rearmost end of the fixed vane 1 or fastened to not shown, turnable shafts, and are in the fig. shown turned relatively to the vanes 1.

The guide vanes 2 may be individually turnable.

The invention claimed is:

1. A rocket engine having a plurality of guide vanes, a plurality of fixed vanes, and an engine nozzle,
   wherein each of the plurality of guide vanes is mounted for turning proximate a rearmost end of one of the plurality of fixed vanes,
   wherein each of the plurality of fixed vanes is parallel to an axis of the engine nozzle and protrudes into a combustion chamber of the engine.

2. The rocket engine as claimed in claim 1, in which a foremost end of each of the plurality of guide vanes is substantially shielded by the rearmost end of one of the plurality of fixed vanes.

3. The rocket engine as claimed in claim 2, in which the plurality of guide vanes are individually turnable.

4. The rocket engine as claimed in claim 1, in which the plurality of guide vanes are individually turnable.

* * * * *